United States Patent [19]

Mosley, Jr.

[11] Patent Number: 5,248,649

[45] Date of Patent: Sep. 28, 1993

[54] PALLADIUM/KIESELGUHR COMPOSITION AND METHOD

[76] Inventor: Wilbur C. Mosley, Jr., 202 Fairway Dr., New Ellenton, S.C. 29809

[21] Appl. No.: 933,152

[22] Filed: Aug. 21, 1992

[51] Int. Cl.$^5$ .................... B01J 23/44; B01J 37/00
[52] U.S. Cl. .................................. 502/262; 502/327
[58] Field of Search ............... 502/412, 262, 327; 423/248

[56] References Cited

U.S. PATENT DOCUMENTS

| | | | |
|---|---|---|---|
| 1,174,631 | 3/1916 | Snelling | 423/248 |
| 2,773,561 | 12/1956 | Hunter | 423/248 |
| 2,777,805 | 1/1957 | LeFrancois et al. | 502/262 |
| 3,963,826 | 6/1976 | Anderson et al. | 423/248 |
| 4,249,654 | 2/1981 | Helversen | 206/7 |
| 4,433,063 | 2/1984 | Bernstein et al. | 502/402 |
| 4,459,270 | 7/1984 | Leppard et al. | 423/248 |
| 4,487,958 | 12/1984 | Ream et al. | 502/262 |
| 4,589,919 | 5/1986 | Goodell et al. | 75/251 |
| 4,687,650 | 8/1987 | Goodell et al. | 423/248 |

*Primary Examiner*—Carl F. Dees
*Attorney, Agent, or Firm*—Harold M. Dixon; William R. Moser; Richard E. Constant

[57] ABSTRACT

A hydrogen-absorbing composition and method for making such a composition. The composition comprises a metal hydride, preferably palladium, deposited onto a porous substrate such as kieselguhr, for use in hydrogen-absorbing processes. The composition is made by immersing a substrate in a concentrated solution containing palladium, such as tetra-amine palladium nitrate. Palladium from the solution is deposited onto the porous substrate, which is preferably in the form of kieselguhr particles. The substrate is then removed from the solution, calcined, and heat treated. This process is repeated until the desired amount of palladium has been deposited onto the substrate.

16 Claims, No Drawings

PALLADIUM/KIESELGUHR COMPOSITION AND METHOD

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to making hydrogen absorption compositions. More particularly, the present invention relates to making palladium/kieselguhr particles for use in hydrogen absorption processes.

2. Discussion of Background

Hydrogen-absorbing materials are well known in the prior art. Furthermore, the use of metal hydrides to absorb, extract, or remove hydrogen from an environment is also known. Several U.S. patents, including Goodell et al (U.S. Pat. No. 4,687,650), Goodell et al (U.S. Pat. No. 4,589,919), Helversen (U.S. Pat. No. 4,249,654), and Leppard (U.S. Pat. No. 4,459,270), disclose various hydride compositions. Also, other patents such as U.S. Pat. No. 4,433,063, by Bernstein et al, and U.S. Pat. No. 4,292,265 by Ron et al, disclose metal hydrides and their uses.

Goodell et al (U.S. Pat. No. 4,589,919) disclose a hydrogen sorbent having approximately 40 vol. % of a hydridable metal or alloy and approximately 60 vol. % of a ballast metal, such as Ni, Cu, Fe, or Al. Also, Goodell et al (U.S. Pat. No. 4,687,650) disclose the use of such a material to extract hydrogen from a hydrogen-containing gas stream.

Numerous methods and processes exist for making these hydrogen-storing materials. The use of drying and calcining in a process for removing hydrogen from wet air streams is disclosed in U.S. Pat. No. 4,459,270 by Leppard. In this patent, Leppard discusses steps for manufacturing materials used in this process. Such steps include drying and calcining the hydride-forming material.

Helversen (U.S. Pat. No. 4,249,654) discloses a hydrogen storage container filled to about 75% of capacity with a hydrogen-storing material. The material has a metal hydride coated on the surface of a diatomaceous earth or other rare earth, porous ceramic, or glass fiber. Hydrogen-storing material such as this, however, tends to breakdown during certain applications, causing plugging problems and the like.

There exists a need for producing hydrogen-absorbing metal hydrides that are not susceptible to breakdown during normal and extended use. It is believed that no such material currently exists.

SUMMARY OF THE INVENTION

According to its major aspects and broadly stated, the present invention is a hydrogen-absorbing composition and method for making such a composition. In particular, it is a metal hydride preferably palladium, deposited within a porous substrate such as kieselguhr, for use in hydrogen-absorbing processes. The composition is made by immersing a substrate in a concentrated solution of tetraammine palladium (II) nitrate. Tetraammine palladium (II) from the solution is deposited onto the porous substrate, which is preferably in the form of kieselguhr particles. The substrate is then removed from the solution, dried, and calcined. This process is repeated until the desired amount of palladium has been deposited into the substrate. Finally, the material is heat treated to ensure reduction of the palladium to metal.

A major feature of the present invention is the ability to incrementally increase the amount of palladium deposited into the substrate. The advantage of this feature is that any desired amount of palladium, within reasonable limits, can be deposited into the kieselguhr substrate. Thus, palladium/kieselguhr (Pd/K) can be made to adapt to a particular application, depending on the desired amount of palladium deposited in the substrate.

Another feature of the present invention is the internal deposition of palladium within the substrate, rather than external coating or depositing on the surface of the substrate. With palladium being uniformly distributed throughout the interior of the substrate, the present invention is less susceptible to problems such as thermal or physical breakdown, unlike current hydrogen-absorbing materials that feature coated substrates. Thus, problems such as palladium particles breaking off and causing plugged lines can be reduced, and in many applications, eliminated entirely.

Still another feature of the present invention is the use of a solution of tetraammine palladium (II) nitrate, rather than a chloride-based solution, to deposit the palladium within the substrate. The present method eliminates chlorine and chlorine reduction methods that exhibit undesirable degradation qualities in current processes.

Other features and advantages of the present invention will be apparent to those skilled in the art from a careful reading of the Detailed Description of a Preferred Embodiment presented below.

DETAILED DESCRIPTION OF A PREFERRED EMBODIMENT

The hydrogen-absorbing composition in its preferred embodiment comprises palladium, a metal hydride, uniformly distributed throughout the interior of a kieselguhr substrate, preferably in the form of granular (30–40 mesh) kieselguhr particles. Palladium/kieselguhr (Pd/K) is used as a hydrogen absorption material in various industrial applications. In addition to using kieselguhr particles as the preferable substrate for palladium, other support materials such as substrates made of glass frit, quartz frit, and sintered aluminum may be used.

The method for making palladium/kieselguhr (Pd/K) particles comprises initially dissolving tetraammine palladium (II) nitrate in chlorine-free water to form a concentrated solution. Then, a porous substrate, preferably granular (30-40 mesh) kieselguhr particles, is immersed in the tetraammine palladium (II) nitrate solution. During immersion, the kieselguhr particles absorb a portion of the concentrated solution.

Excess tetraammine palladium (II) nitrate solution is separated from the kieselguhr substrate, saturated with solution, preferably by drawings off or draining away. The kieselguhr substrate, together with a nominal amount of tetraammine palladium (II) nitrate deposited within, is then dried in an oven at about 100° C.

Next, the kieselguhr substrate containing tetraammine palladium (II) nitrate is calcined. This step involves passing the kieselguhr particles through a rotary calciner operating at approximately 450° C. in air. The calciner is used to thermally decompose the tetraammine palladium (II) nitrate that has been absorbed in the kieselguhr substrate.

If the palladium deposited within the kieselguhr substrate does not comprise the desired percent by weight of the composition, the process steps are repeated until the desired amount of palladium is deposited within the kieselguhr. By repeating the process steps, it is meant that the kieselguhr particles are once again immersed in concentrated tetraammine palladium (II) nitrate solution, removed from the solution, dried, and calcined. This immersion-drying-calcining cycle is repeated until the palladium content reaches the desired level. For instance, eight immersion-drying-calcining cycles provides a palladium content of approximately 53% of the composition.

When the repetition of the immersion-drying-calcining cycle has produced a composition with the desired content of palladium, usually dependent on the application, the material then is heated at approximately 500° C. in a 4% H-96% He atmosphere. This step reduces the composition's small amount of palladium oxide which is believed to be a by-product of the calcining process.

The present method produces Pd/K that is much more structurally sound than Pd/K made by prior methods, such as processes using chloide. Also, the present method does not degrade the kieselguhr structure.

It will be apparent to those skilled in the art that many changes and substitutions can be made to the preferred embodiment herein described without departing from the spirit and scope of the present invention as defined by the appended claims.

What is claimed is:

1. A composition for use in absorbing hydrogen, said composition made by a process comprising the steps of:
    preparing a solution containing a metal hydride in chlorine-free water;
    immersing a substrate in said solution, said solution being deposited onto said substrate;
    separating said substrate from said solution;
    drying said substrate;
    calcining said substrate; and
    heating said substrate.

2. The composite as recited in claim 1, wherein said process further comprises the step of repeating said immersion, removal, drying, and calcining steps to increase the amount of said solution absorbed by said substrate, said deposited amount increasing by said repetition.

3. The composite as recited in claim 1, wherein said substrate is selected from the group consisting of kieselguhr, glass frit, quartz frit and sintered aluminum.

4. The composite as recited in claim 1, wherein said metal hydride is palladium hydride.

5. The composite as recited in claim 1, wherein said solution is tetraammine palladium (II) nitrate dissolved in said chlorine-free water.

6. The composite as recited in claim 1, wherein said substrate is in the form of particles.

7. The composite as recited in claim 1, wherein said process further comprises the step of repeating said immersion, removal, drying, and calcining steps until the concentration of said metal hydride is approximately 55% by weight of said composite.

8. A composition for use in absorbing hydrogen, said composition comprising:
    a substrate; and
    a metal hydride deposited into said substrate, said metal hydride comprising at least 55% by weight of said composite.

9. The composition as recited in claim 8, wherein said substrate is selected from the group consisting of kieselguhr, glass frit, quartz frit and sintered aluminum.

10. The composition as recited in claim 8, wherein said metal hydride is palladium hydride.

11. The composition as recited in claim 8, wherein said substrate is in the form of kieselguhr particles.

12. A method for making a composite for absorbing hydrogen, said method comprising the steps of:
    dissolving tetraammine palladium (II) nitrate in chlorine-free water to form a solution;
    immersing a substrate in said solution for a period of time until said solution is deposited onto said substrate;
    drying said substrate, said drying step further comprising initially draining off a portion of said solution not absorbed into said substrate;
    calcining said substrate in air; and
    heating said substrate in a carrier gas atmosphere.

13. The method as recited in claim 12, further comprising the step of repeating said immersion, removal, drying, and calcining steps to increase the amount of said solution absorbed by said substrate.

14. The method as recited in claim 12, wherein said substrate is selected from the group consisting of kieselguhr, glass frit, quartz frit and sintered aluminum.

15. The method as recited in claim 12, wherein said substrate further comprises a group of kieselguhr particles.

16. The method as recited in claim 12, further comprising the step of repeating said immersion, removal, drying, and calcining steps until the concentration of said palladium is approximately 55% by weight of said composition.

* * * * *